United States Patent [19]

Randall

[11] 4,107,880
[45] Aug. 22, 1978

[54] FLOATING BUFFING WHEEL ASSEMBLY

[76] Inventor: John P. Randall, W153 N5264 Plaza Dr., Menomonee Falls, Wis. 53051

[21] Appl. No.: 654,064

[22] Filed: Feb. 2, 1976

[51] Int. Cl.² .............................................. B24B 5/18
[52] U.S. Cl. ................................... 51/103 TF; 51/99
[58] Field of Search ...... 51/103 R, 103 TF, 103 WH, 51/99, 98 R; 125/13 SS

[56] References Cited

U.S. PATENT DOCUMENTS

| | | | |
|---|---|---|---|
| 1,493,787 | 5/1924 | Little | 51/99 |
| 1,835,668 | 12/1931 | Peaslee | 51/103 TF |
| 2,247,183 | 6/1941 | Bour | 125/13 SS |
| 2,442,042 | 5/1948 | Hamilton | 51/99 |
| 2,754,640 | 7/1956 | Fuller et al. | 51/236 |
| 2,823,408 | 2/1958 | Meadors, Jr. | 51/236 |
| 2,990,655 | 7/1961 | Guinn | 51/99 |
| 3,751,856 | 8/1973 | Jorgensen | 51/99 |
| 3,854,250 | 12/1974 | Vornberger | 51/99 |

Primary Examiner—Harold D. Whitehead
Assistant Examiner—Roscoe V. Parker
Attorney, Agent, or Firm—Ronald E. Barry

[57] ABSTRACT

A floating buffing wheel assembly including a conveyor for rotating a workpiece and simultaneously axially moving the workpiece past a buffing wheel which is supported on one end of a support arm and counterbalanced by a drive motor on the other end of the support arm, the force of the surface of the buffing wheel acting on the surface of the workpiece being reduced to a minimum and further including a force adjustment assembly for controlling the force of the surface of the buffing wheel acting on the surface of the workpiece.

10 Claims, 5 Drawing Figures

FLOATING BUFFING WHEEL ASSEMBLY

BACKGROUND OF THE INVENTION

Polishing or buffing of machine parts has traditionally been accomplished by hand-held or hand-operated polishing wheels or belts. Polishing of a workpiece by a wheel or belt requires the proper application of pressure or force of the polishing medium to the surface of the workpiece in order to produce a high quality finish. Proper application of pressure between the belt or wheel and the workpiece is important since the heat of friction produced by the belt or wheel results in a flow action on the surface of the workpiece due to heat buildup which is critical to a uniform surface finish. However, improper application of pressure results in a shortened life of the belt or wheel as well as a non-uniform finish on the surface of the workpiece. The polishing wheel or belt also has to be changed to progressively finer grain surfaces in order to obtain a high quality finish. On almost all prior devices, the workpiece had to be passed through the polishing wheel or belt at least once each time the belt or wheel was changed. Because of the precise control required in applying the pressure with a belt or wheel and the continuous change to finer grain materials, operators had to be specially trained in order to achieve a finish quality acceptable to the industry.

SUMMARY OF THE INVENTION

The floating buffing wheel assembly of the present invention provides for a final high quality finish in a single pass of the workpiece past the buffing wheel. This is accomplished by utilizing a low density abrasive wheel and counterbalancing the wheel so that a minimum of pressure is applied to the surface of the workpiece at all times and at a constant rate regardless of any variations which exist in the contour of the workpiece. The life of the buffing wheel is thereby increased and operation of the workpiece can be accomplished by an operator having minimal skills. Where an unusually rough finish is to be polished or an exceptionally high mirror finish is required, multiple buffing wheel assemblies can be used simultaneously to complete the finish of the workpiece in a single pass through the assembly. It has been found that the use of this machine has resulted in surface finishes which are better than anticipated by the manufacturers of low density, abrasive buffing wheels. Considering 0 micro-inch measure as a mirror finish, the manufacture of the low density abrasive buffing wheels rated the wheels at 16 micro-inch finish. However, it has been found that by the use of the automatic counterbalanced floating buffing wheel assembly according to the present invention, the finish of the same abrasive wheel has been improved to a rating of 9 micro-inch.

DRAWINGS

DESCRIPTION OF THE INVENTION

Figure 1:
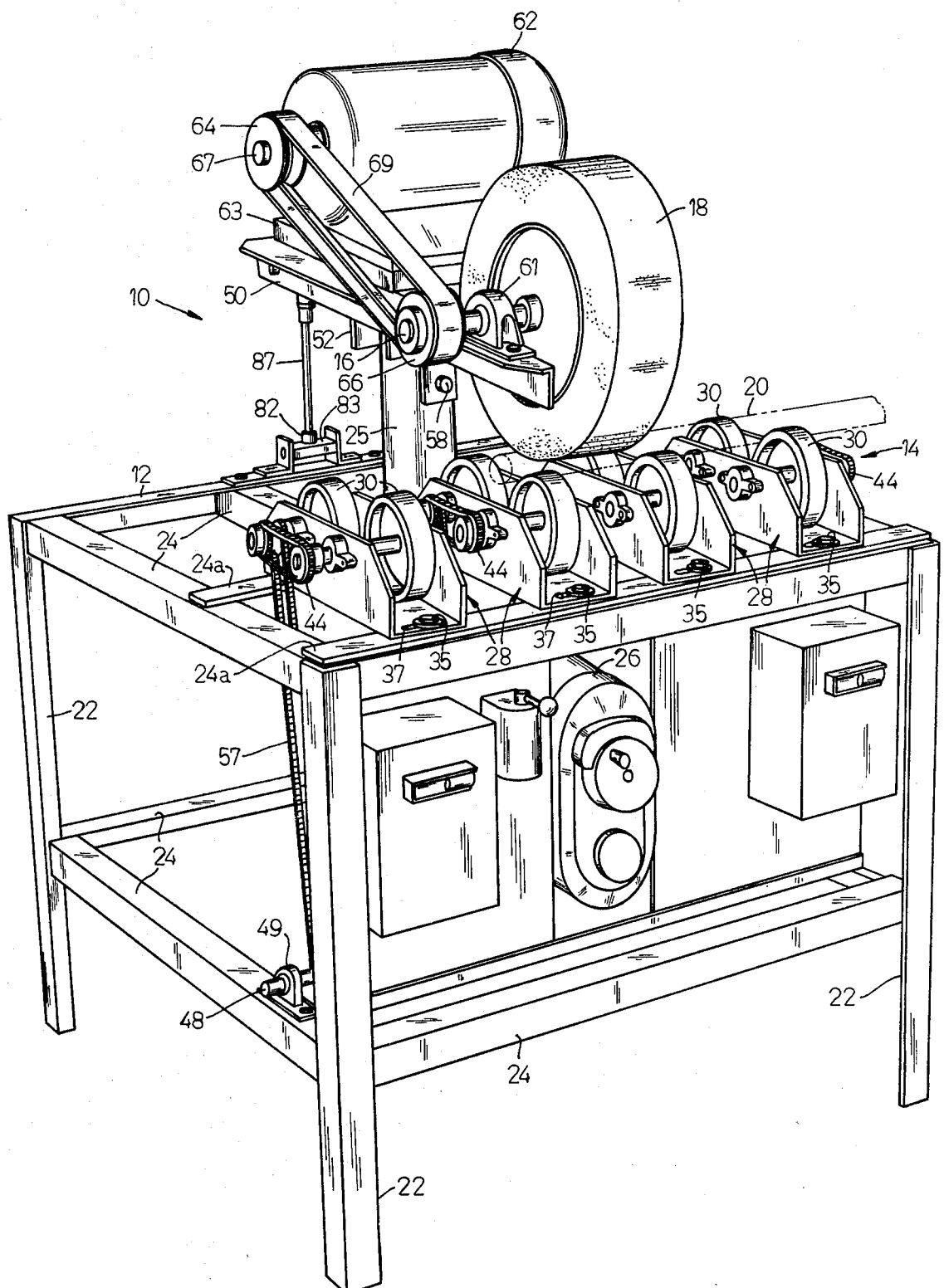
FIG. 1 is a front perspective view of the buffing wheel assembly showing the transporting means in relation to the abrasive buffing wheel.

The floating buffing wheel assembly 10 of the present invention as shown in FIG. 1, includes a stand 12 having means in the form of a rotating axial feed conveyor 14 mounted on the top of the frame for moving a tubular workpiece 20 axially across the top of the frame. A buffing wheel 18 is positioned to rotate transversely to the axial path of motion of the workpiece 20 on the conveyor 14. The workpiece or tubular workpiece 20 is placed on one end of the conveyor and is moved axially past the buffing wheel 18 at a lineal speed of approximately 2-3 feet per minute and a rotary speed of 100 r.p.m. As the stock 20 moves under the buffing wheel 18 it is engaged by the buffing wheel and completely polished to a mirror-like finish in a single pass through the assembly.

More particularly, the frame 12 includes a number of corner angle irons or legs 22 and a number of longitudinal and lateral support members 24. The conveyor 14 is mounted on the upper longitudinal members 24 and is driven by means of a variable speed motor 26 that is mounted on the lower members 24. A support post 25 in the form of a rectangular column is welded to a cross member 27 provided on the support members 24.

FEED CONVEYOR ASSEMBLY

Figure 2:
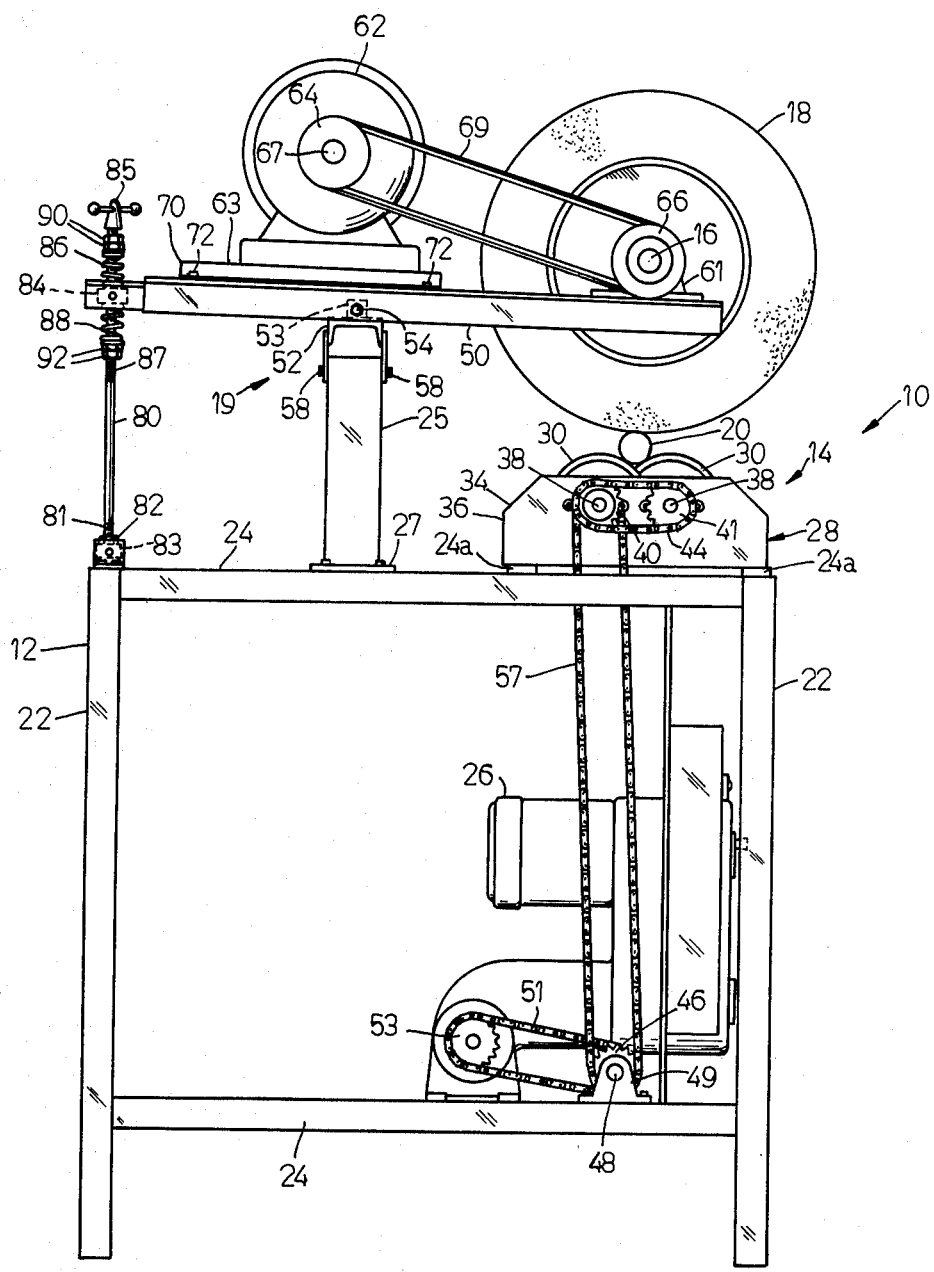
FIG. 2 is a side view in elevation showing the support assembly for the buffing wheel and the force adjustment assembly for the buffing wheel.
Figure 4:
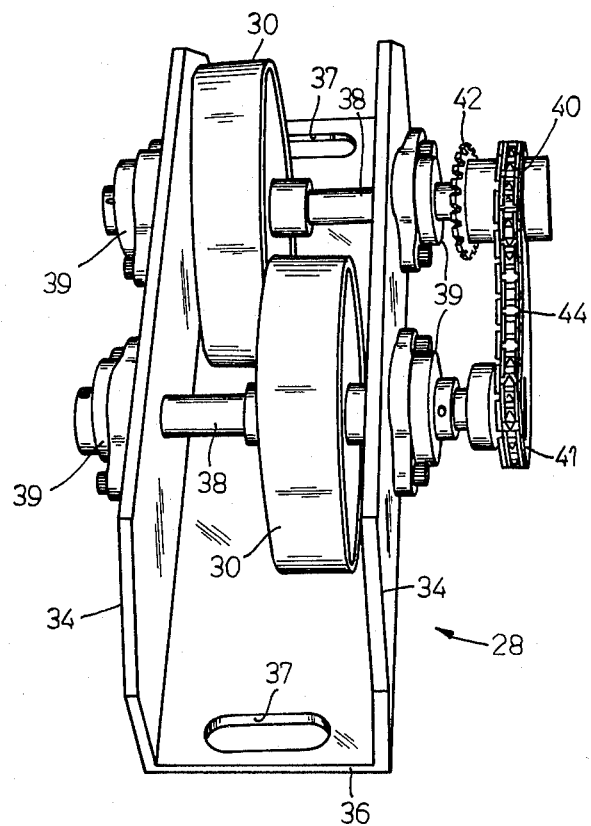
FIG. 4 is a perspective view of one of the conveyor drive assemblies for transporting a workpiece across the buffing wheel assembly.
Figure 5:
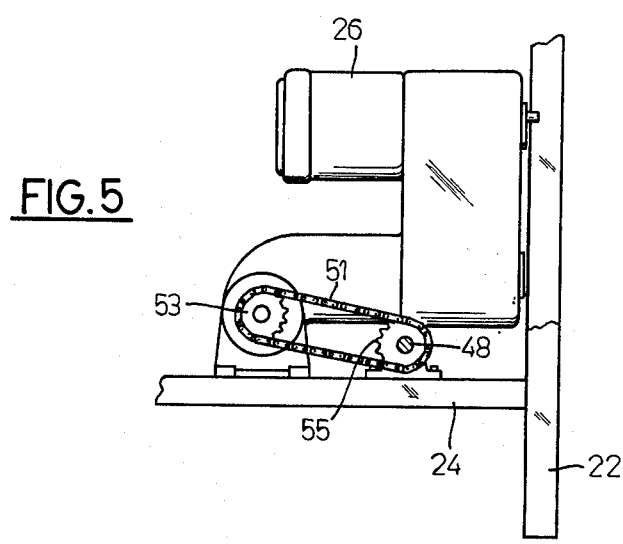
FIG. 5 is a side view in section of a part of the buffing wheel assembly showing the conveyor drive motor.
Figure 3:
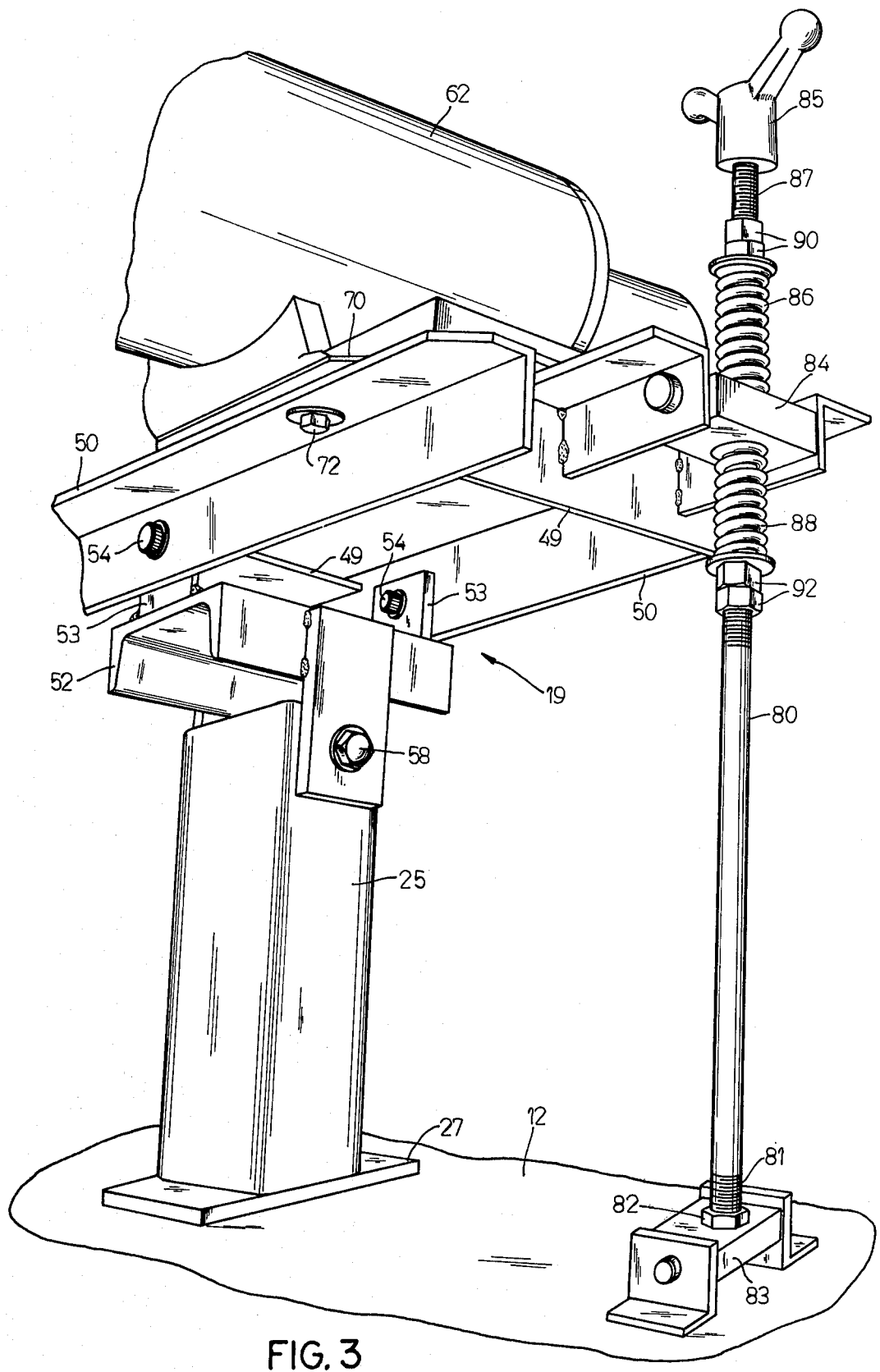
FIG. 3 is a perspective view of a portion of the motor mounting frame showing the pivot points for adjusting both the alignment of the buffing wheel with the surface of the workpiece as well as the force of the buffing wheel acting on the workpiece.

The conveyor 14 as seen in FIGS. 1, 2 and 4, includes a number of separate drive assemblies 28 mounted in a spaced relation on members 24a. Each drive assembly 28 includes a channel member 36 having a mounting slot 37 at each end. A pair of axles 38 are journalled in bearings 39 mounted in the sidewalls 34 of the channel member 36. A drive sprocket 40 and a driven sprocket 41 are provided on one end of each of the axles 38. Wheels 30 are mouned on the axles 38 between the sidewalls 34 of the channel member 36 and are driven in the same direction by means of a chain 44 mounted on the drive sprocket 40 and driven sprocket 41.

The drive assembly 28 is driven by means of the motor 26 which is mounted on the frame 12. The motor 26 is connected to a drive shaft 48 which is journalled in bearings 49 by a chain 51 mounted on drive sprocket 53 and driven sprocket 55. The drive shaft 48 is connected to one of the axles 32 by a chain 57 mounted on sprockets 46 and 42.

The workpiece 20 is moved axially on the conveyor by offsetting the drive assemblies 28 on the stand 12. As seen in FIG. 1 and 4, the assemblies 28 are mounted on the frame by means of bolts 35 which pass through the slots 37 provided on each end of the channel members 36. The channel members 36 are all offset in a parallel relation to each other and at an angle which provides 2-3 lineal feet of axial motion per minute. The speed of axial movement of the workpieces 20 on the conveyor can be adjusted by varying the offset angle of the drive assemblies with respect to the support members 24. Since the wheels 30 on each assembly rotate in the same direction, the workpiece will rotate in the opposite direction as it moves axially through the drive assemblies 28.

THE BUFFING WHEEL ASSEMBLY

The buffing wheel 18 is mounted on a floating buffing wheel support 19 and is supported on the buffing wheel assembly 10 in a position to engage the surface of the workpiece 20 on the conveyor 14. The amount of force or pressure applied by the wheel 18 to the surface of the workpiece 20 is minimized by counterbalancing the weight of the wheel 18 with the weight of a drive motor 62 mounted on the floating support 19.

In this regard, the support 19 includes a pair of support arms or members 50 connected in a parallel spaced relation by cross members 49. Means are provided for pivotally mounting the support members 50 on the post 25. Such means is in the form of a pivot plate 52 having a pair of side plates 53. The pivot plate 52 is pivotally mounted on the post 25 on the frame 12 by means of a bolt 58. The support members 50 are pivotally connected to the side plates 53 by bolts 54. The support members 50 are free to pivot transversely to the direction of motion of the workpiece 20. The pivot plate 52 is pivotable about an axis transverse to the direction of travel of the workpiece 20 to allow for alignment of the buffing wheel surface with respect to the surface of the workpiece 20.

The buffing wheel 18 is in the form of a low density abrasive wheel sold under the name 3M Scotch Bright Wheel. The wheel has a diameter of approximately 14 inches and is 4 inches wide. Various diameters and widths of wheel can be used depending on the type of material and type of finish desired.

The buffing wheel 18 is mounted on a shaft 16 journalled in bearings 61 provided on the members 50. The wheel 18 is driven by means of a drive motor 62 which is mounted on a mounting plate 70 which is secured to the support members 50 by bolts 72. The wheel 18 is driven by means of a drive sheave 64 provided on the motor shaft 67 and a driven sheave 66 is provided on the shaft 16. A drive belt 69 is mounted on the sheaves 64 and 66.

Means are provided for counterbalancing the weight of the drive motor 62 with respect to the weight of the buffing wheel 18 in order to reduce the force of the wheel 18 acting on the workpiece 20. This can be seen in FIG. 2 wherein the motor 62 is shown mounted on the adjustable mounting plate 70 located above the pivot bolt 54. The plate 70 includes a number of slots (not shown) and is secured to the members 50 by bolts 72. The bolts 72 can be loosened to allow movement of the mounting plate 70 on the members 50. It should be apparent that with this arrangement, the position of the motor 62 with respect to the pivot axis of the bolt 54 can be adjusted to increase or decrease the pressure of the wheel 18 acting on the workpiece.

FORCE ADJUSTMENT ASSEMBLY

Means are provided for adjusting the force of the surface of the buffing wheel 18 acting on the surface of the workpiece 20. In this regard, the position of the buffing wheel 18 must be stabilized with respect to the workpiece in order to hold this force constant and yet allow a small amount of floating action to adjust for variations in the contour of the surface of the workpiece without a substantial variation in the force applied to the workpiece. This is accomplished by means of an adjusting rod 80 connected to the end of the support member 50 and the frame 12.

In this regard, the rod 80 includes a threaded section 81 which is threadedly received in a nut 82 mounted on a cross member 83 on one of the support members 24. The rod 80 is rotated by means of a handle 85 to move the threaded end 81 of the rod 80 in nut 82 and thereby move the support members 50 up or down about pivot bolt 54.

Floating action of the support members 50 to compensate for variations in the contour of the surface of the workpiece is provided by means of a pair of compression springs 86 and 88 provided on the rod 80 on either side of a cross bar 84 mounted on the end of the support members 50. In this regard, the rod 80 includes a threaded section 87 at the upper end. A pair of adjustment nuts 90 and 92 are threadedly received on the threaded section 87 of the rod 80 above and below the springs 86 and 88. By moving the nuts 90 and 92 toward or away from each other, the spring force of the compression springs 86 and 88 can be increased or decreased. Since the cross bar 84 on the end of the support members 50 is located between the two compression springs 86 and 88 adjusting the position of the nuts 90 and 92, the compressive forces of the springs will be increased or decreased to vary the polishing force of the buffing wheel with respect to the surface of the workpiece. By rotating the rod 80 with respect to the nut 82 the position of the buffing wheel 18 is adjusted with respect to the surface of the workpiece 20. It has been found that a maximum pressure of less than five pounds is preferable for most finishes.

Although the floating polishing wheel assembly of the present invention has been described in connection with a conveyor for simultaneously rotating and axially moving the workpiece, it is within the contemplation of this application to use different means for supporting the workpiece for different movements. In this regard the workpiece can be supported for axial rotary or lineal motion with respect to the polishing wheel. In some instances it may be necessary to support the workpiece in a fixed position on the frame and to use a movable support means for moving the floating polishing wheel assembly relative to the workpiece.

I claim:
1. A buffing wheel assembly comprising:
a main frame,
means on said frame for transporting a workpiece across the frame,
a buffing wheel having a flat cylindrical buffing surface,
means on said frame for supporting the buffing surface on said buffing wheel in a position to engage the surface of the workpiece as it passes the wheel, said support means including a post and a pivot plate pivotally mounted on said post for adjusting the position of the buffing surface with respect to the surface of the workpiece and a support frame pivotally mounted on said pivot plate,
means on said support frame for driving said buffing wheel,
and means for balancing the weight of the buffing wheel, said balancing means includes a threaded rod connected to the supporting means and the main frame, a pair of compression springs mounted on the rod on opposite sides of the support means and a nut on the rod on each side of the compression springs for adjusting the force of the springs acting on the support means, whereby the buffing wheel will follow the surface of the workpiece.

2. The assembly according to claim 1 wherein said transporting means includes means for rotating said workpiece as the workpiece moves across the frame.

3. The assembly according to claim 1 wherein said driving means includes a motor movably mounted on said support frame whereby the weight of the buffing wheel acting on the workpiece surface can be counterbalanced by the weight of the motor.

4. A floating polishing wheel assembly comprising: a frame
   means on said frame for simultaneously moving a cylindrical workpiece across said frame and rotating said workpiece on its own axis,
   a support member pivotally mounted on said frame,
   a polishing wheel mounted on said support member and having a cylindrical buffing surface located in a position to engage the surface of the workpiece,
   a motor mounted on said support member in a position to counterbalance the weight of said buffing wheel, said motor being connected to drive said buffing wheel,
   and offsetting bias means connected between said support member and said frame producing opposed forces on said support member for floating the buffing surface of said polishing wheel on the surface of said workpiece.

5. The assembly according to claim 4 wherein said pressure maintaining means includes a pair of springs positioned to engage opposite sides of said support member to provide equal but opposite forces on said support member to allow said polishing wheel to float with respect to said workpiece.

6. The assembly according to claim 5 wherein said pressure maintaining means includes a threaded rod having one end threadedly connected to said frame whereby rotation of said rod will adjust the position of the polishing wheel with respect to said workpiece.

7. An automatic polishing device comprising:
   a frame,
   means on said frame for driving a workpiece in a predetermined path on said frame,
   a support post mounted on said frame,
   a pivot plate pivotally mounted on said post,
   a support member pivotally mounted on said pivot plate,
   a polishing wheel rotatably mounted on said support member in a transverse relation to the direction of motion of said workpiece,
   a motor mounted on said support member on the opposite side of said pivot in a position to counterbalance the weight of said polishing wheel, said motor being connected to drive said polishing wheel,
   and offsetting bias means connected between said frame and said support member producing opposed forces on said polishing wheel for floating the polishing wheel on the surface of said workpiece.

8. The device according to claim 7 wherein said providing means comprises a pair of springs located on opposite sides of said support member.

9. The device according to claim 7 wherein said workpiece driving means includes means for rotating the workpiece with respect to said polishing wheel.

10. The device according to claim 9 wherein said workpiece is rotated in the same direction as said polishing wheel.

* * * * *